United States Patent [19]
Keil et al.

[11] Patent Number: 4,767,171
[45] Date of Patent: Aug. 30, 1988

[54] TRANSMISSION AND RECEPTION MODULE FOR A BIDIRECTIONAL COMMUNICATION NETWORK

[75] Inventors: Rudolf Keil, Munich; Franz Mayerhofer, Puchheim; Hans L. Althaus, Lappersdorf; Ekkehard Klement, Munich, all of Fed. Rep. of Germany

[73] Assignee: Siemens Aktiengesellschaft, Berlin and Munich, Fed. Rep. of Germany

[21] Appl. No.: 13,639

[22] Filed: Feb. 11, 1987

[30] Foreign Application Priority Data

Mar. 27, 1986 [DE] Fed. Rep. of Germany ....... 3610404

[51] Int. Cl.$^4$ ............................................. G02B 6/32
[52] U.S. Cl. ............................ 350/96.18; 350/96.16; 350/96.20; 370/3; 455/610; 455/612
[58] Field of Search ............... 350/96.15, 96.16, 96.18, 350/96.20; 455/610, 612; 370/1, 3

[56] References Cited
U.S. PATENT DOCUMENTS
4,237,474 12/1980 Ladany ....................... 350/96.20 X

FOREIGN PATENT DOCUMENTS 0197841 10/1986 European Pat. Off. ......... 350/96.15
0197842 10/1986 European Pat. Off. ......... 350/96.15
58-220111 12/1983 Japan ............................. 350/96.20
60-153011 8/1985 Japan ............................. 350/96.15
60-230108 11/1985 Japan ............................. 350/96.16

Primary Examiner—John Lee
Attorney, Agent, or Firm—Hill, Van Santen, Steadman & Simpson

[57] ABSTRACT

A transmission and reception module for a bidirectional optical communication network characterized by a housing containing a laser diode, a first spherical lens for focussing the output of the laser diode on a first beam path, a second spherical lens arranged on the first beam path for focussing the light from the first lens at a focal point at which an end face of an optical fiber is positioned, a beam splitter which is at least partially transmissive to light of a first wavelength from the laser diode and partially reflective of light of a second wavelength being emitted from the fiber into a second beam path on which a detector is positioned. To improve the positioning, the first lens and the laser diode are mounted on a carrier member in a fixed relationship which enables assembling the device with less problems with maladjustment.

26 Claims, 4 Drawing Sheets

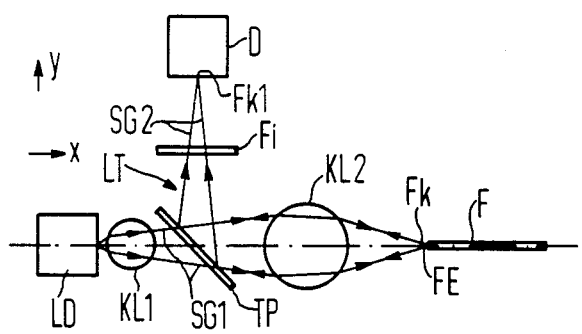
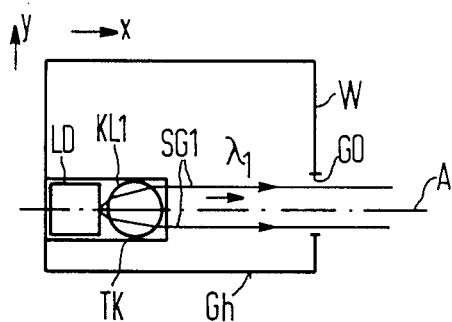
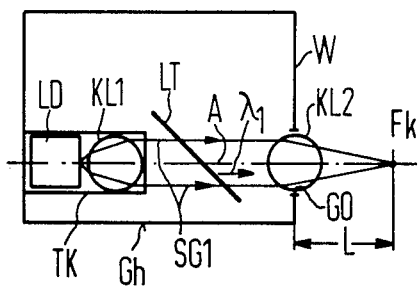

TRANSMISSION AND RECEPTION MODULE FOR A BIDIRECTIONAL COMMUNICATION NETWORK

BACKGROUND OF THE INVENTION

The present invention is directed to a transmission and reception module for a bidirectional communication network, particularly a broadband ISDN, wherein the module includes a housing which contains an optical transmitter for transmitting a first light wavelength along a first beam path, has a first lens and a second lens arranged in succession on the first beam path with the first lens focussing a divergent light from the transmitter towards a beam of parallel waves and the second lens further focussing the beam to a focal point at which an end of an optical fiber is held by a portion of the housing. A light beam separating device is arranged in the first beam path between the first and second lenses and is at least partially transmissive to the light of the first wavelength while being partially reflective of light of the second wavelength to branch off or divide off a portion of the second wavelength along a second optical path, a detector which is sensitive to the second wavelength is positioned on the second path for converting electrical signals contained in the beam of the second wavelength.

In transmission and reception modules of the above-mentioned type, problems occur with the maladjustment of the various parts.

SUMMARY OF THE PRESENT INVENTION

The object of the present invention is to provide a structure for a module which can be constructed without problems with maladjustment.

This object is achieved by an improvement in the communication network which has a housing containing an optical transmitter for transmission of a light of a first wavelength along a first optical path, a first lens adjacent the optical transmitter for focussing the divergent light emitted by the transmitter into either a beam of substantially parallel light or at least less divergent light, a second lens arranged on the first path for focussing the light from the first lens to a focus point on which an end of an optical fiber is mounted by the housing, a light beam separating device positioned between the first and second lens and being at least partially transmissive to the light of the first wavelength and partially reflective to light of a second wavelength coming from said fiber, said light beam separating device reflecting light of the second wavelength along a second optical path, a detector which is sensitive to the light of the second wavelength being positioned on the second path for receiving the light of the second wavelength. The improvements are that the transmitter and the first lens are mounted on a common carrier which is rigidly connectable to the housing and that the transmitter and first lens are positioned relative to each other without maladjustment.

The solution is based on the perception that the most sensitive location, given the module of the above type, lies in the position between the transmitter and the first lens, which is immediately proximate to the transmitter. It has been found that, given typical focal lengths in a region of a millimeter or less for the first lens, a potential maladjustment between the transmitter and the first lens must be smaller than 0.1 $\mu$m. By contrast thereto, maladjustments of up to 40 $\mu$m in the lateral direction and up to 100 $\mu$m in the fiber-axial direction are tolerated between the second lens and the end of the fiber. What is thereby to be understood by "maladjustment-proof fixing" is that maladjustments that are less than 0.5 $\mu$m are at most tolerated between the transmitter and the first lens.

The preferred and advantageous developments of the module in accordance with the present invention are further defined by the fact that the carrier member is preferably composed of a material having good thermal conductivity and the transmitter is directly secured thereto and that the first lens is mounted on a block of material having poor thermal conductivity which block extends between the carrier member and the lens. Preferably, the block has metalized surfaces with one being secured to the carrier member with a solder layer and that a carrier lamina is interposed between the upper surface of the block and is soldered thereto. The other surface of the carrier lamina has the lens secured thereto.

If the first lens converts a diverging light into parallel extending beam and the second lens then converts the light into a focal point, then a third lens is positioned in the second beam path for focussing the reflected light of the second wavelength onto the detector. However, if the first lens only partially focusses the diverging light beam into a less diverging light beam so that the second light lens has to focus a diverging light beam into a focal point, then the second lens will focus the light of the second waveguide to converge as it is reflected by the beam separating device onto a focal point on the detector.

Other advantages are obtained if the light beam separating device or beam splitter is wavelength selective and, for example, is a partially transmitting mirror which is inclined at an angle relative to the axis of the first beam path and which is transmissive to the light of the first wavelength while reflecting the light of the second wavelength. Such a wavelength selective partially transmitting mirror can be obtained as an interference filter which is formed by a plurality of dielectric layers which are applied to a lamina of transparent material. It is also advantageous to provide an optical filter in the second beam path which will transmit light of the second wavelength, but will filter out light of the first wavelength. If the optical filter is provided, then it is possible to use a partially transmitting mirror as the light beam separating device, which light transmitting mirror is partially transmissive to the light of both the first and second wavelengths and, thus, reflects a portion of both wavelengths. Thus, the filter will insure that light of the first wavelength does not reach the detector. Such a mirror can be formed of lamina of a material which is identically partially transmitting to both wavelengths. The filter can either be a separate unit which is placed in the second beam path or it can be applied directly onto a face of the detector. Preferably, the lenses are spherical lenses and the second lens is either mounted directly in the housing or can be mounted in a portion of a connector part which is secured or mounted on the housing.

The detector and an electrical preamplifier, which immediately follows each detector, are preferably integrated on a common substrate which is positioned in the housing.

If the second lens is mounted in the housing, then the module can be manufactured by the following method:

the transmitter and first lens are adjusted relative to one another in three directions on the carrier member which is rigidly connected to the housing and is adjusted so that the light of the first wavelength is focussed by the first lens to pass along a first optical axis and through an opening disposed on the first optical axis in a wall of the housing opposite to the transmitter with the axis being substantially perpendicular to the plane of the wall. In the next step, the light beam separating device or beam splitter, as well as the second lens are then adjusted relative to the first optical axis and are fixed in the housing with the second lens being adjusted so that its focal point that it produces of the beam light is arranged at a defined distance from the opposite housing wall. A connector part is then attached to the opposite housing wall and contains or mounts the end of the fiber at this fixed distance from the front surface of the part that engages the opposite wall and is adjusted in the two directions parallel to the wall so that the end of the fiber is arranged at the focal point of the light of the first wavelength. The detector is then adjusted and fixed relative to the focal point of the second beam path of light for the reflected portion of the second wavelength that is reflected by the separating device.

In a second modification, in which the second lens is carried in the conector part, the first step of the method is substantially the same and the second step involves positioning the beam separating device and the connector part, which contains the second lens, together with the end of the fiber so that the connecting part is adjusted in the two directions that are parallel to the wall of the housing to place the axis of the fiber and the center of the second lens on the axis of the focus light of the first wavelength. The detector is then adjusted and fixed relative to the focus light of the second beam path so that the light of the second wavelength coming from the fiber will be reflected by the beam splitter onto the detector.

In another possible method for forming the device, the connector part which contains the second lens and the end of the optical fiber are positioned on the housing wall with the axis of the fiber and the center of the lens being directed at the axis of the light transmitter to fall on the light exit location of the transmitter. Subsequently, the beam splitting device or the light beam separating device is mounted and adjusted to be on this axis and then the detector is arranged on the second beam path to receive the focussed beam of the second wavelength on the second path. Then, the first lens is subsequently adjusted in the three directions relative to the transmitter and the end of the fiber to insure that the light from the fiber again is focussed on the exit location of the transmitter. During these methods, the adjustment steps are preferably monitored in a magnified condition on a television screen by utilizing a video camera to observe the adjustment steps and by taking the output of the camera and converting it to a picture on a TV screen.

BRIEF DESCRIPTION OF THE DRAWINGS

FIG. 4 is a simplified view corresponding to FIG. 1 of the inside of the module showing an embodiment where the second lens of this system also focusses a second beam of light onto the detector;

FIGS. 5a–5b are schematic views showing the various adjustment steps of a first method for manufacturing the module with FIG. 5a showing a positioning of the carrier having the transmitter and the first lens in the housing; FIG. 5b showing the positioning of the light beam splitter and the second lens which is mounted in the wall of the housing.

DESCRIPTION OF THE PREFERRED EMBODIMENTS

Figure 1:
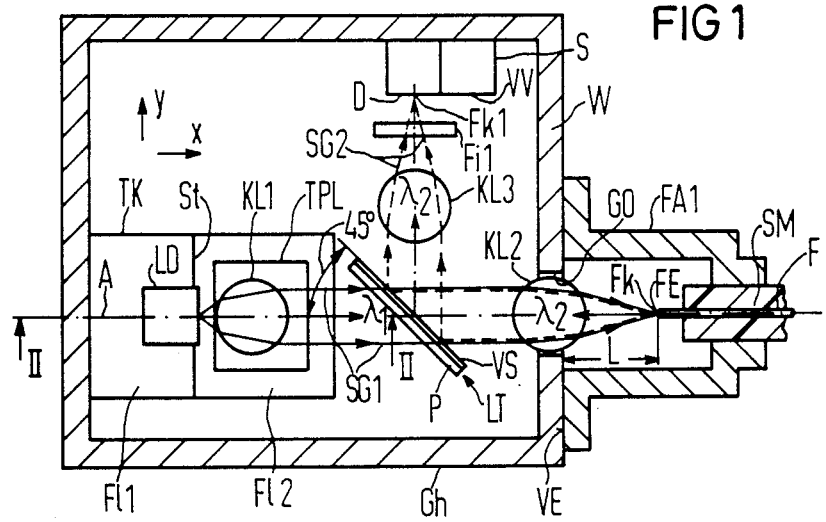
FIG. 1 is a horizontal cross-sectional view taken along line I—I of FIG. 2 through a module having a second lens which is remote from the transmitter being mounted in the housing.

The principles of the present invention are particularly useful when incorporated into a module of FIG. 1 having a housing Gh. A step carrier TK of copper is secured in the housing Gh. The carrier has an upper planar surface F11 which is separated by a step St from a lower planar surface F12. A transmitter LD, which is a laser diode emitting light on an axis A, is mounted onto the upper surface F11 with a portion of the transmitter projecting over the step St. A first lens KL1, in the form of a spherical lens, is mounted approximate to the transmitter and is fixed on the lower surface F12 of the carrier TK with the center Mi of the spherical lens coinciding with the axis A of the laser diode forming the transmitter LD.

To mount the first spherical lens KL1, a block QB of material having a poor thermal conductivity has a side SF1 on which a metal layer MS1 is applied so that the block QB can be soldered onto the surface F12 of the carrier TK by means of solder layer Lt1. A carrier lamina TPL having a metallic surface Sf1 is soldered to an upper side SF2 of the block QB, which upper side SF2 has a metal layer MS2 which provides a solder connection with a solder layer Lt2. The first spherical lens KL1 is soldered with a glass solder Glt to an upward facing metallic surface Sf2 of the carrier lamina TPL.

For example, the block QB can be composed of a silica glass and the carrier lamina TPL can be composed of a silicon lamina metallized on both sides. However, the lamina could also be composed of a metal layer.

The adjustment of the laser diode LD and the first spherical lens KL1, which is proximate to the transmitter, relative to one another is expediently undertaken so that the laser diode LD is first fixed to the carrier TK and the spherical lens KL1 is then adjusted relative to the diode. This occurs most expediently upon exploitation of the softness of the hot solder Lt2. Such a method and implementation thereof has already been proposed in a copending U.S. application, Ser. No. 855,275, filed Apr. 24, 1986 (now U.S. Pat. No. 4,741,796) which application is incorporated by reference and was based on German patent application No. 35 19 260.

The carrier block TK should be composed of a material having a good thermal conductivity so that it dissipates the heat generated by the laser diode LD. Securing the lens KL1 approximate to the laser on the same carrier member TK guarantees that any potential maladjustments between the laser diode LD and this first lens KL1 will remain less than 0.5 $\mu$m.

A laser light having a wavelength $\lambda_1$ is divergently emitted by the laser diode LD and is focussed into parallel light along a first beam path SG1 by the spherical lens KL1 which is located adjacent to the transmitter and this parallel light propagates along an axis A. A wavelength-selective, partially transmissive mirror or beam splitter LT is arranged in the beam path SG1 of the light and is inclined at an angle of 45° relative to the axis A. This partially transmissive mirror LT is partially transmissive for light of the first wavelength $\lambda_1$, but acts reflectively for light of a second wavelength $\lambda_2$, which is applied from a fiber F. The wavelength selective, partially transmitting mirror is composed of a lamina P of a transparent material on which an interference filter in the form of multiple dielectric layers VS is applied.

The parallel light of the first wavelength $\lambda_1$, which has passed through the light beam separating device or beam splitter LT will impinge on a second lens KL2 which is remote from the transmitter and which is arranged and fixed in an opening GO of a wall W of the housing Gh. This second lens KL2 is likewise fashioned as a spherical lens. This second lens KL2 focusses the light of the one wavelength $\lambda_1$ onto a focal point Fk which is arranged at a defined distance L from the wall W of the housing Gh.

A connector part FA1 is secured to the wall W and a fiber F, which is surrounded by a protective cladding SM is fixed in the connector part FA1 so that an end FE of the fiber F will coincide with the focal point Fk. It is thereby expedient to fix the end FE of the fiber F in the connector part FA1 so that at the very onset the end FE is arranged at a definite distance L from a front end surface or mounting surface VE which is secured on the wall W of the housing Gh. Thus, the end FE of the fiber F is already situated at the definite distance L from the wall W and only an adjustment in the y-direction and the z-direction is necessary to insure that the end FE lies on the focal point Fk and the axis A of the light on the first beam path SG1.

Light of a second wavelength $\lambda_2$ is divergently emitted from the end FE of the fiber F, and is emitted towards the second lens KL2, which is remote to the transmitter LD and this lens KL2 will focus it into parallel light to impinge on the light beam separating device or beam splitter LT. The beam splitter LT will deflect this light by 90° and therefore deflect it out of the beam path SG1 into a second beam path SG2. A third lens KL3, in the form of a spherical lens, is arranged in the second beam path SG2 of this deflected light to focus the deflected light to a focal point Fk1. A window (not shown) of a detector D is arranged at this focal point Fk1, and the detector D is preferably integrated, for example, on a common substrate S together with an electrical preamplifier VV that receives the output of the detector D. In order to reduce the cross talk, a filter Fi1 that is transmissive for light of the second wavelength $\lambda_2$, but is not transmissive for the light of the first wavelength $\lambda_1$ is arranged in this second beam path SG2 of the light of the second wavelength $\lambda_2$.

Figure 2:
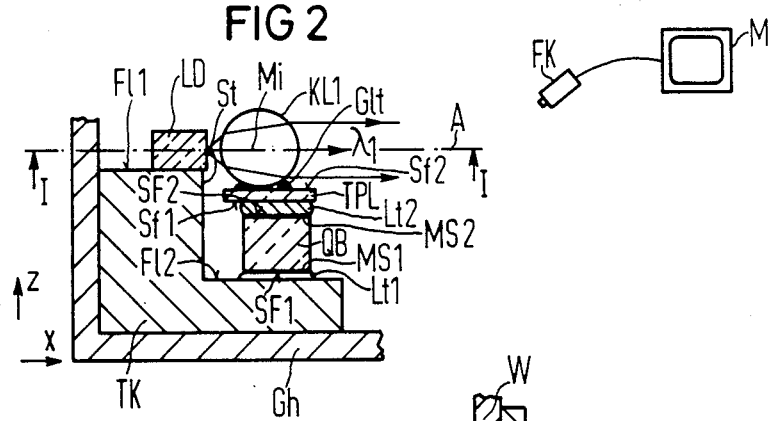
FIG. 2 is a partial cross-sectional view taken along the lines II—II of FIG. 1 and shows the carrier member having the transmitter and the first lens which is immediately adjacent the transmitter secured thereto.
Figure 3:
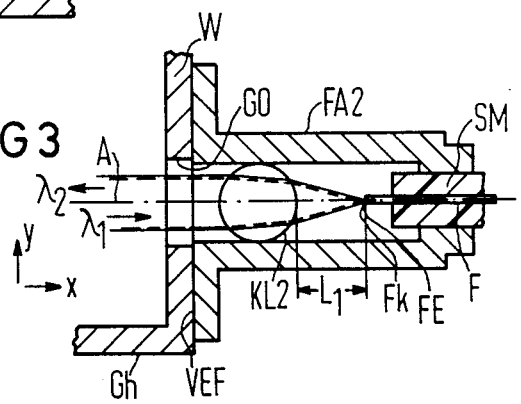
FIG. 3 is a partial horizontal cross-sectional view similar to FIG. 1, showing a modification in the mounting of the second lens.

A modification of the module of FIGS. 1 and 2 is shown in FIG. 3. In this modification, the second lens KL2 and the fiber F are also arranged and fixed in a common coaxial relationship to one another in a connector part FA2. The second lens KL2 and the end FE of the fiber F are thereby to be arranged at such a distance $L_1$ from one another that light incident in parallel on the lens KL2 is focussed onto the end FE of the fiber F.

If the first lens KL1 does not focus the light of the first wavelength $\lambda_1$ divergently emitted by the transmitter LD into parallel light, but only into weakly divergent light as illustrated in FIG. 4, then the third lens KL3 which was used in the embodiment of FIG. 1 to focus the light of the second wavelength $\lambda_2$ onto the detector D can be eliminated. The light of the second wavelength $\lambda_2$, which is divergently emitted by the end FE of the fiber F is then focussed into convergent light by the second lens KL2 with the light having a focal point Fk1 at which the detector can be arranged.

The light beam separating device or beam splitter LT can also be composed of a partially transmitting mirror TP arranged in the beam path SG1 of the light of the first wavelength $\lambda_1$ between the first lens KL1 and the second lens KL2. This partially transmitting mirror TP will be inclined at an angle, for example 45° relative to the axis A of the beam path and has identical transmission or reflecting behavior for both wavelengths $\lambda_1$ and $\lambda_2$. In this case, however, an optical filter Fi that is non-transmitting for the first wavelength $\lambda_1$ but is transmitting for the second wavelength $\lambda_2$ must be arranged in the second beam path SG2 of the light of the second wavelength $\lambda_2$, which is directed at the detector D. This light splitting device TP which is shown as being used in a module of FIG. 4, can also be employed for other modules.

The partially transmitting mirror TP can be fashioned in the form of a lamina of a material which is identically partially transmitting for both wavelengths $\lambda_1$ and $\lambda_2$. The filter Fi can be fashioned in the form of a lamina of a material that is non-transmitting for the first wavelength $\lambda_1$, but by contrast, is transparent to the other wavelength $\lambda_2$. While the filter Fi is illustrated as being a separate element in the second beam path SG2, it can be directly applied to a surface of the detector D. Every filter utilized in the module can be designed as an interference filter.

The method steps for constructing the module of FIG. 1 are schematically illustrated in FIGS. 5a–5d. In the first step, the laser diode LD and the first spherical lens KL1 are adjusted relative to one another in all three directions, x, y and z, on the carrier member TK and then firmly connected to the carrier member. The carrier member TK is then positioned in the housing Gh and firmly connected in an adjusted position wherein the light of the first wavelength $\lambda_1$ is focussed by the first lens KL1 to emerge through an opening GO so that the optical axis A of this focus light extends essentially perpendicular to the wall W (see FIG. 5a).

In the next step, the light separating device or beam splitter LT and the second lens KL2 are adjusted to be on the axis A and are secured in the housing Gh. The second lens KL2 is adjusted so that its focal point Fk is arranged at a definite distance L from the housing wall W, as illustrated in FIG. 5b.

In the next step, the fiber F has been secured in a connector part FA1 with the end FE of the fiber F being a definite distance L from an end face or mounting surface VE of the connector part FA1. The connector part FA1 is then attached to the wall W after it has been displaced in both the y and z directions parallel to the wall W to adjust and fix the end FE of the fiber F at the focal point Fk of the first wavelength $\lambda_1$ (see FIG. 5c).

In the next step, the light of the second wavelength $\lambda_2$ coming from the end of the fiber is reflected by the beam splitter LT into a second beam path SG2. With a third lens KL3 being used for focussing the light of the second beam path SG2, this lens is adjusted to the axis of the second beam path before or at the same time as a detector D is adjusted to have its window positioned at the focal point Fk1 of the second beam SG2.

Figure 5C:
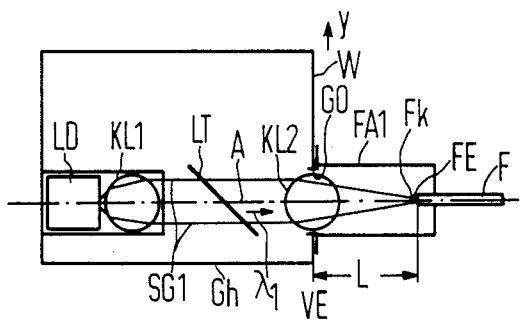
FIG. 5c showing attaching the connector mounting the fiber.
Figure 5D:
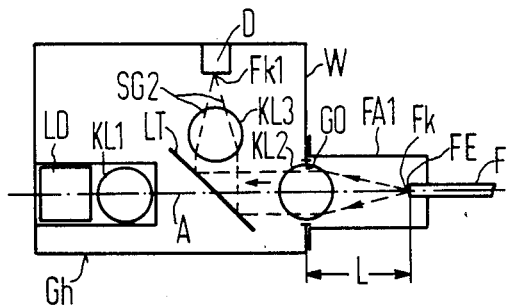
FIG. 5d showing the mounting of the third lens and the detector.
Figure 5E:
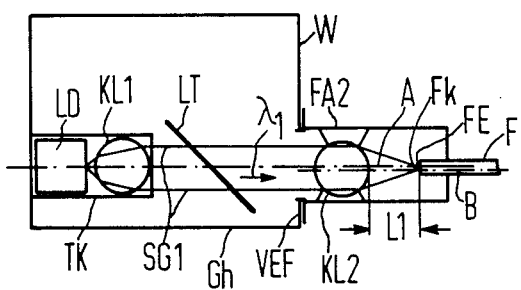
FIG. 5e is an alternate step for FIG. 5b when the second lens is mounted in the connector.

In the embodiment utilizing a connector part FA2 of FIG. 3, one can proceed according to the method of FIGS. 5a–5d. The adjustment of the second lens KL2 in the housing Gh as shown in FIG. 5b merely has to be replaced by the procedure indicated in FIG. 5e. In particular, this amounts to a second step of providing the connector part FA2 that has the second lens KL2 on a common axis B of a fiber F secured in the connector part. In addition, the end FE of the fiber F is a finite distance L1 from the second lens KL2. The connector part FA2 is then adjusted until the axes A and B coincide with no angle occurring therebetween. Since the wall W and the end face or mounting surface VEF are well-defined, planar surfaces and the axis B can be directed precisely perpendicular to this end face VEF, the axial parallelism between the axes A and B can be simply achieved when a precisely perpendicular alignment of the axis A as possible relative to the wall W is already obtained during the first step as illustrated in FIG. 5a. The only adjustments in the x direction and the z direction are now carried out for the connector FA2.

When the connector part FA2 is correctly fixed and adjusted, the detector D is adjusted and fixed to the focal point FK1 of the second beam path SG2 of the light of the second wavelength $\lambda_2$ coming from the beam splitting device LT. This light of the second wavelength $\lambda_2$ emerges divergently from the end FE of the fiber F and is focussed by the second lens KL2. The positioning of the detector in the final step is the same as that for FIG. 5d.

Figure 6A:
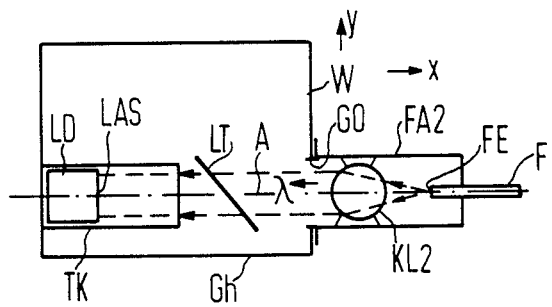
FIGS. 6a–6c show various simplified steps or stages of a second method for the manufacturing of the module with the connector containing the second lens with FIG. 6a showing the steps of mounting the connector on the housing and positioning the carrier with the transmitter so that the light from the fiber is received on the light exit location of the transmitter, FIG. 6b showing mounting of the third lens and the detector to receive the light reflected by the beam splitter, and FIG. 6c showing the mounting of the first lens on the carrier in a position to insure that the light from the transmitter will be focussed onto the end of the fiber.
Figure 6B:
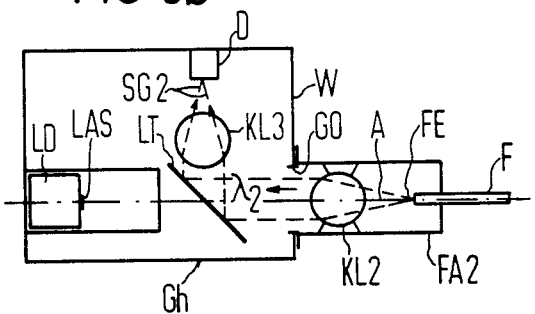
Figure 6C:
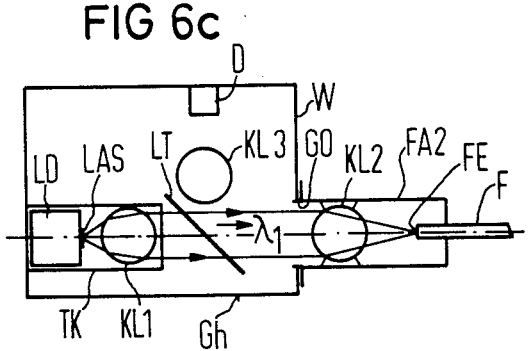

It should be noted that in the manufacturing of a module according to FIG. 1 having the connector part FA2 of FIG. 3, one can also proceed as schematically shown in FIGS. 6a–6c.

In accordance with this method, the connecting part FA2 is first adjusted and fixed on a wall W of the housing Gh so that an axis A of a light divergently emerging from the end FE of the fiber F is focussed by the second lens KL2 and has passed through the light beam separating device LT to be directed onto a laser diode LD which is secured in the housing Gh. In particular, it is desired that the light strikes the light exit location LAS of the diode LD (see FIG. 6a). The detector D is adjusted and fixed onto the focal point Fk1 of the second beam path SG2 which is reflected from the beam splitting device LT and this adjustment includes adjusting the position of the third lens KL3 (see FIG. 6b). Subsequently, the first lens KL1 is adjustably set relative to the laser diode LD in all three directions, x, y and z, so that the end FE of the fiber F and the light exit location LAS of the laser diode LD are imaged on one another or, respectively, form points that are conjugated relative to one another (see FIG. 6c). This last adjustment expediently occurs with the light of the first wavelength $\lambda_1$ being emitted by the laser diode LD.

In all of these adjustments, at least, however, in a relative adjustment of the transmitter LD and the first lens KL1, it is expedient to monitor the adjustment in a magnified manner on a television screen M (see FIG. 2). To this end, for example, a magnified image of the parts to be adjusted can be picked up by utilizing a video camera FK (FIG. 2), which will produce an image which is converted into a picture on the television screen M.

Although various minor modifications may be suggested by those versed in the art, it should be understood that we wish to embody within the scope of the patent granted hereon all such modifications as reasonably and properly come within the scope of our contribution to the art.

We claim:

1. In a transmission and reception module for a bidirectional optical communication network, particularly for a broad band ISDN, said module comprising a housing, an optical transmitter for the transmission of a first light wavelength on a first beam path being disposed in said housing, first and second lenses being arranged in succession on the first beam path with the first lens focussing a divergent light emitted by the transmitter and the second lens focussing the light from the first lens onto a focal point, a connector mounted on the housing and positioning an end face of an optical fiber at said focal point, said fiber emitting light of a second wavelength into the housing, a light beam splitter being arranged in the first beam path between the first and second lenses and being at least partially transmissive to the first wavelength and being at least partially reflective of light of the second wavelength to branch off a portion of the light of the second wavelength in a second beam path, a light detector sensitive to the light of the second wavelength being positioned on the second beam path to receive said light of the second wavelength, the improvements comprising the transmitter and the first lens being fixed on a common carrier member, said common carrier member being rigidly connectable to said housing so that the transmitter and first lens are positioned maladjustment proof relative to one another.

2. In a transmission and reception module according to claim 1, wherein the carrier member comprises a step member having first and second surfaces, said transmitter being fixed on the first surface of the carrier member and the first lens being secured on the second surface which is at a level below the level of the first surface.

3. In a transmission and reception module according to claim 2, wherein the carrier member is composed of a material having a good thermal conductivity and the transmitter is secured directly on said first surface and wherein the first lens is mounted on a block of material having poor thermal conductivity which is secured on said second surface.

4. In a transmission and reception module according to claim 3, wherein the block has a metalized surface soldered by a layer of solder to the second surface of the carrier member, a carrier lamina having a metalized surface being soldered with a solder layer to a metalized upper surface of the block, and said first lens being secured on said carrier lamina.

5. In a transmission and reception module according to claim 1, wherein the module includes means for focussing the light of the second wavelength at a focal point on the surface of the detector.

6. In a transmission and reception module according to claim 5, wherein the light beam splitter is composed of a wavelength-selective partially transmitting mirror which is inclined at an angle relative to the axis of the first beam path and is transmissive to the light of the first wavelength and reflective of the light of the second wavelength.

7. In a transmission and reception module according to claim 6, wherein the wavelength-selective partially transmitting mirror comprises an interference filter.

8. In a transmission and reception module according to claim 7, wherein the interference filter is formed of multiple dielectric layers applied to a lamina of transparent material.

9. In a transmission and reception module according to claim 6, wherein an optical filter is arranged in the second beam path so that light of the second wavelength passes through said filter prior to reaching the detector, said optical filter being non-transmitting to the light of the first wavelength, but transmitting of the light of said second wavelength.

10. In a transmission and reception module according to claim 5, wherein the light beam splitter is composed of a partially transmitting mirror being arranged in the first beam path between the first and second lenses and having the same transmission and reflection behavior for light of both the first and second wavelengths, an optical filter being arranged in the second beam path, said optical filter being non-transmitting for the light of the first wavelength and transmitting for light of the second wavelength.

11. In a transmission and reception module according to claim 10, wherein the partially transmitting mirror is fashioned in the form of a lamina of material which is identically partially transmitting for both wavelengths.

12. In a transmission and reception module according to claim 10, wherein the filter is fashioned in the form of a lamina of material which is non-transmitting to the first wavelength is transparent to the light of the second wavelength.

13. In a transmission and reception module according to claim 10, wherein the filter is applied directly to a surface of the detector.

14. In a transmission and reception module according to claim 10, wherein the filter is constructed in the form of an interference filter.

15. In a transmission and reception module according to claim 5, wherein the first lens focusses the light emitted by the transmitter into substantially a parallel beam of light, said second lens focussing the light of the second wavelength from the fiber into a parallel beam of light, and said means for focussing the light of the second wavelength at a focal point on the surface of the detector includes a third lens positioned between the beam splitter and said detector.

16. In a transmission and reception module according to claim 5, wherein the first lens focusses the light from the transmitter into a weakly divergent light, said means for focussing the light of the second wavelength at a focal point includes the second lens focussing the divergent light from the first lens to a focal point and focussing the light of the second wavelength from the fiber into a convergent beam with a focal point on the detector.

17. In a transmission and reception module according to claim 1, wherein all the lenses are spherical.

18. In a transmission and reception module according to claim 1, wherein the second lens is accepted and fixed in the housing of the module.

19. In a transmission and reception module according to claim 1, wherein the second lens is mounted in a connector part which mounts the fiber, and said connector part is secured to said housing.

20. In a transmission and reception module according to claim 1, wherein said detector and an electrical preamplifier for receiving the output of the detector are integrated on a common substrate which is arranged in the housing of said module.

21. A method for manufacturing a module having a housing containing a carrier on which a light transmitter and a first lens are secured, a second lens being mounted on said housing in a first beam path of the light from said transmitter, a beam splitter being positioned in the housing between the first and second lens and splitting light of a second wavelength from a fiber secured in a connector at a focal point of the second lens onto a detector mounted in the housing, said method comprising the steps of providing the housing having a wall with an opening, securing the transmitter and the first lens on the carrier with adjustments in three directions to have the center of the first lens receiving an axis of the light from said transmitter, securing the carrier in the housing with a beam of light formed by the first lens emerging from the opening in the housing on an optical axis extending substantially perpendicular to said wall, positioning a light splitting device on said optical axis in said housing, positioning a second lens at said opening and on the optical axis with the focal point of the second lens being a fixed distance from the wall of the housing, providing a connector part supporting a fiber having a fiber end face at said fixed distance from a mounting surface of the connector part, mounting the connector part with said mounting surface on the wall of the housing, adjusting the part in the two directions parallel to a plane of the wall to fix the fiber end face at the focal point of the second lens, mounting a third lens in a second path of the light branched from said beam splitter, and positioning a detector at a focal point of said third lens.

22. A method according to claim 21, which includes observing all of the adjustment of the transmitter and lenses by a video camera and displaying a magnified image on a television screen.

23. A method of manufacturing a module having a transmitter and first lens mounted on a carrier positioned in a housing, a second lens being on a first beam from the transmitter and first lens and being mounted in a connector part with an optical fiber having an end face on a focal point of said second lens, a beam splitter arranged between the first and second lens for branching out a light from the fiber in a second beam path and a detector arranged for receiving the light on the second beam path, said method comprising the steps of providing a housing, positioning a transmitter and a first lens on a carrier with the first lens being positioned relative to the output of the transmitter in all three directions, securing the carrier in the housing with the output of the light from the transmitter being focussed by the first lens on a first beam path through an opening in a wall of the housing on a first optical axis, providing a connector part containing a second lens and the optical fiber with the end face at the focal point of said second lens, positioning the connector part in two directions parallel to the plane of the wall with the axis of the fiber coinciding with the first beam path, securing the connector part in the desired position, positioning a beam splitter device between the first and second lens with the beam splitter device splitting light from said fiber into a second beam path and subsequently positioning a detector on the second beam path to receive light therefrom.

24. A method according to claim 23, which further includes observing each of the adjustment steps by video recording the steps and displaying the video recording on a video monitor in a magnified form.

25. In a method of assembling a module having a transmitter and a first lens mounted on a carrier in a housing, a second lens being mounted in a connector part carrying a fiber having an end face at a focal point of said second lens, the connector part being mounted on the housing on the axis of the transmitter, a beam splitter device being positioned between the first and second lens for splitting light from the fiber into a second beam path and a detector located on the second beam path, said method comprising the steps of providing the housing, positioning the carrier with the transmitter in said housing with the axis of the light from said transmitter passing through an opening of the housing, positioning a connector part containing the second lens and the fiber with the axis of the fiber coinciding with the axis of the transmitter by projecting light from said fiber at the transmitter and moving the carrier and connector part until the light from said fiber falls on the light exit location of said transmitter, securing the carrier and the connector part on said housing, positioning the beam splitter device in said housing between the carrier and the second lens, projecting light through the fiber at the beam splitter device to create a second beam path and positioning a detector to receive the light of the second beam path, securing the detector in the fixed position, then positioning the first lens on the carrier in three directions while operating the transmitter to obtain an optimum position with a maximum focus of the light from the transmitter on the end face of the fiber and then securing the first lens in the optimum position.

26. In a method according to claim 25, wherein the steps include observing the adjustment steps in a magnified form by video recording the steps and presenting the video recording on a monitor screen.

* * * * *